July 15, 1969        B. ROTA ETAL        3,455,230
COFFEE BREWER
Filed March 20, 1968        3 Sheets-Sheet 3
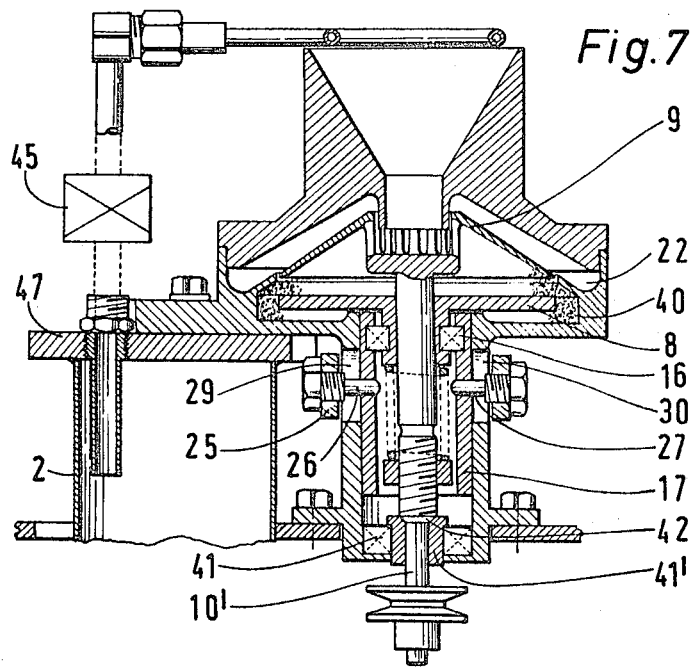
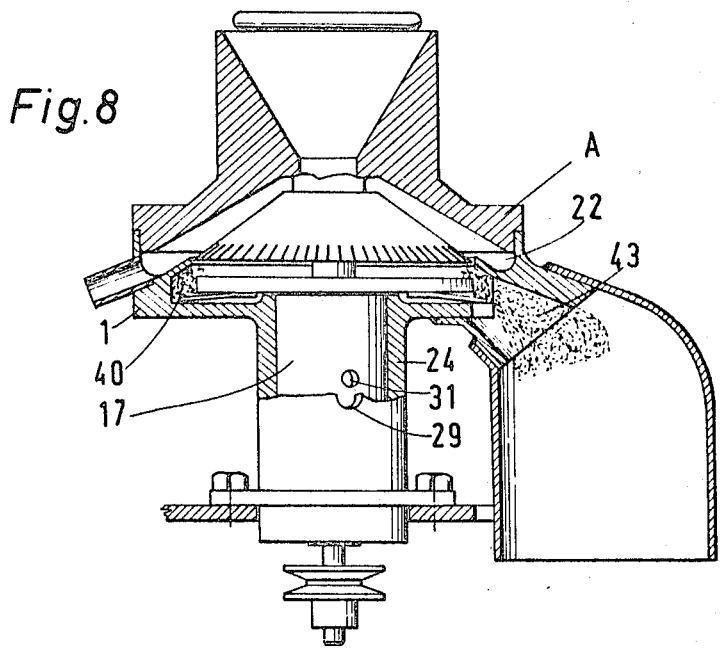

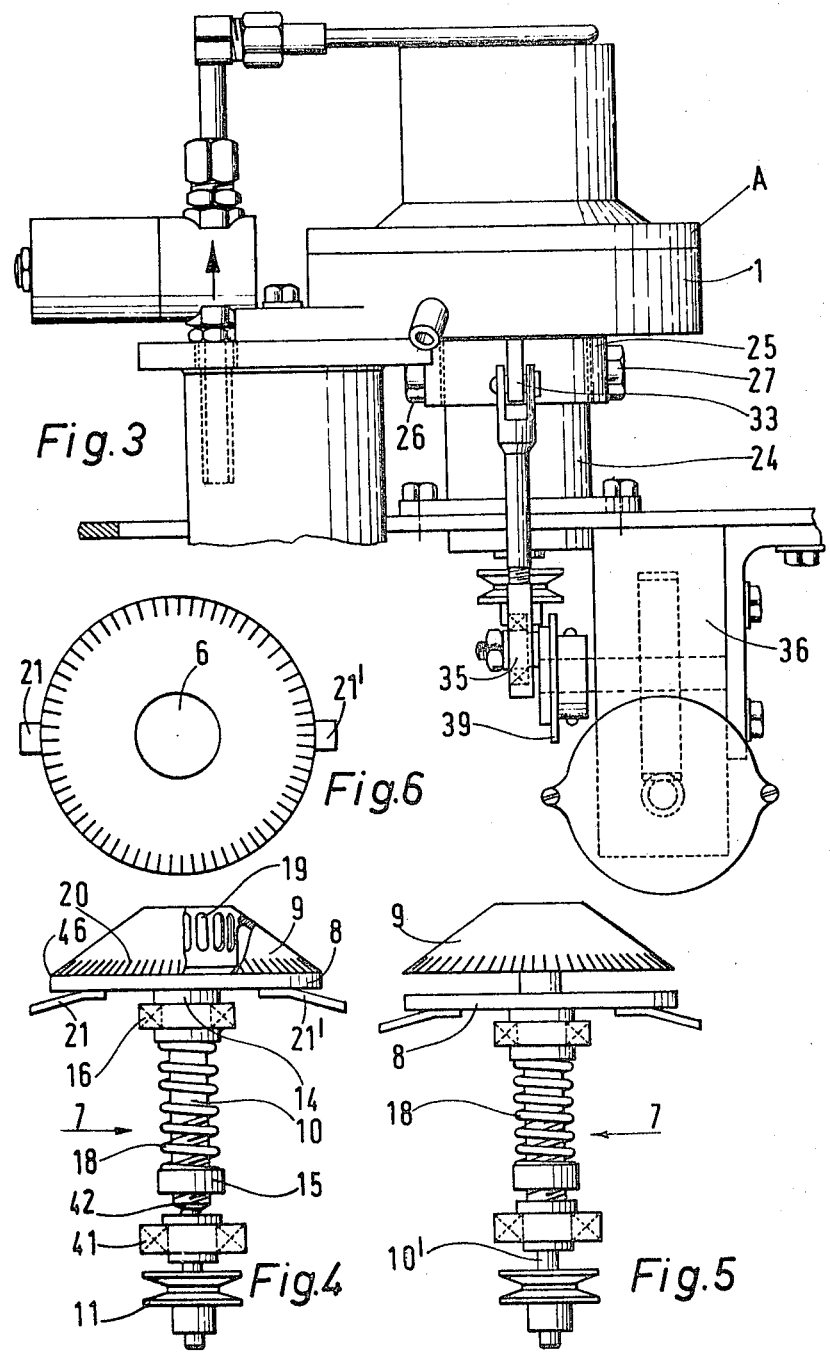

United States Patent Office 3,455,230
Patented July 15, 1969

3,455,230
COFFEE BREWER
Beniamino Rota and Walter Tosetto, both of Corso
Benedetto Brin 20, Turin, Italy
Filed Mar. 20, 1968, Ser. No. 714,646
Claims priority, application Italy, Apr. 22, 1967,
51,432/67
Int. Cl. A47j 31/44
U.S. Cl. 99—287                                             11 Claims

ABSTRACT OF THE DISCLOSURE

A centrifugal coffee brewer for preparing coffee liquor ready for consumption and for discharging the exhausted coffee grounds, comprising a fixed unit and a rotatable unit vertically shiftably mounted within the fixed unit. The coffee liquor is prepared in a brewing chamber in the rotatable unit, which is rotating at high speed, and is discharged into an upper annular chamber surrounding the brewing chamber in the brewing position. Then the rotatable unit is lowered mechanically by means of a suitable drive and transmission system and in the lower position of the rotatable unit a circumferential aperture is formed at the brewing chamber which is composed of two relatively vertically movable parts and the circumferential aperture will be level with a lower annular chamber surrounding the brewing chamber in the lower position thereof and the coffee grounds will be discharged by centrifugal force into the lower annular chamber.

---

This invention relates to a centrifugal coffee brewer for preparing coffee liquor ready for consumption and for discharging the exhausted coffee grounds.

In the coffee brewer according to the invention, two elements arranged coaxially one above the other, forced against each other by a spring and defining a brewing chamber, are set in rotation at a constant high speed after ground coffee has been introduced into the brewing chamber and hot water has been added thereto immediately afterwards. The hot water will then be centrifugated together with the ground coffee and thrown through a radially disposed filter into an upper annular chamber circumferentially surrounding the brewing chamber and will be collected in a channel and conducted into a cup or other container in the form of coffee liquor ready for consumption while the two rotating elements will simultaneously be lowered until the connection therebetween is level with a lower annular chamber, whereupon the lower element will be lowered still further away from the upper element which is arrested, so as to form a relatively wide circumferential opening between the two elements, through which the exhausted coffee grounds are discharged by centrifugation into the lower annular chamber and from there are conducted into a collecting vessel.

A preferred embodiment of the invention will now be described by way of example and with reference to the accompanying drawings, in which:

FIG. 3 is a lateral view of the coffee brewer;

FIG. 4 is a lateral view, partly in section, of the rotatable unit in the inoperative position;

FIG. 5 is a lateral view of the rotatable unit in the position for discharging the coffee grounds;

FIG. 6 is a top plan view of the rotatable unit;

FIG. 7 is a vertical section corresponding to FIG. 3, but with the brewer in the position for discharging the coffee grounds; and FIG. 8 is a view, partly in section at right angles to FIG. 7, showing the coffee grounds discharge opening with the movable unit in the position of FIG. 7.

Figure 1:
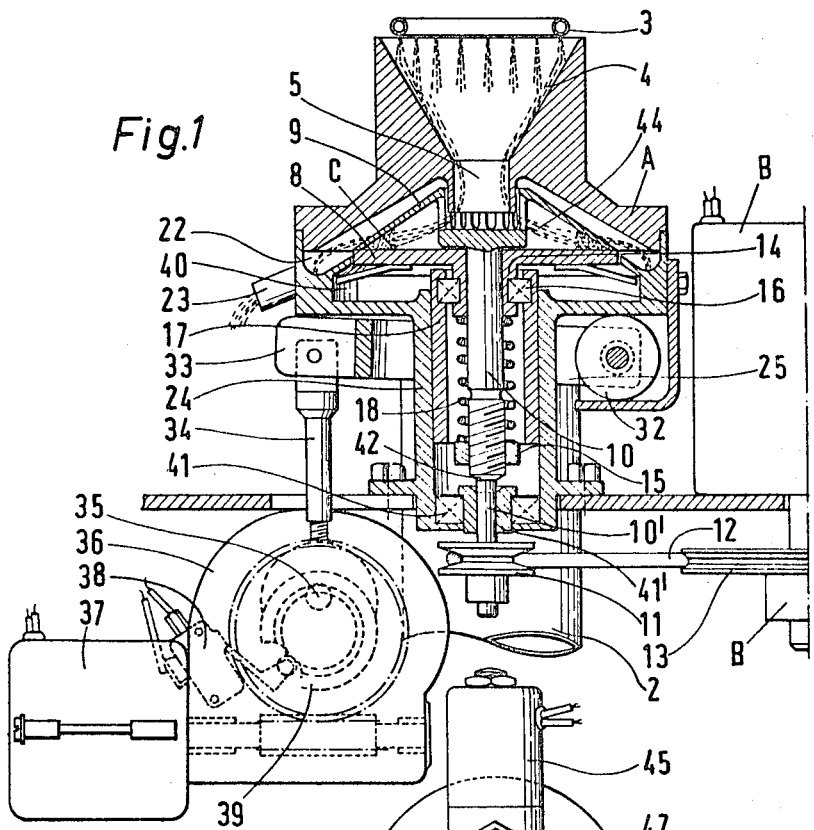
FIG. 1 is a vertical section through a coffee brewer according to the invention in the working position for brewing the coffee.
Figure 2:
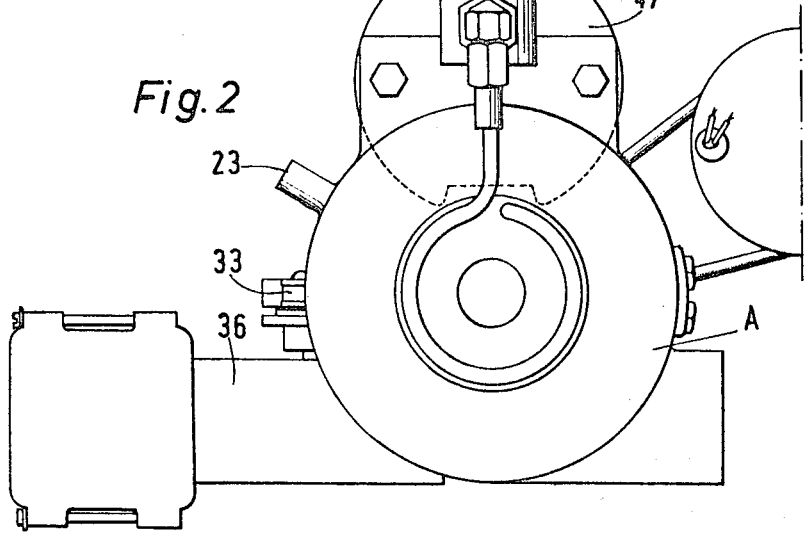
FIG. 2 is a top plan view of FIG. 1.

Referring to FIG. 1, the coffee brewer is generally indicated by 1. A hot water boiler 2 is provided to supply hot water through a conduit to an annular tube 3 open at the bottom and located above a hopper 4 of inverse frustoconical shape. The hopper 4 forms part of a cover A of the brewer and has at its lower end a cylindrical conduit 5 which slightly projects into a recess 6 provided in a rotatable unit generally indicated by 7 in FIGS. 4 and 5, the recess 6 being shown in FIG. 6.

The rotatable unit 7, which is shown separately in FIGS. 4, 5 and 6, is insertable in the coffee brewer 1 which for this purpose has a corresponding inwardly hollow configuration. The rotatable unit 7 comprises two coaxially juxtaposed bodies, i.e. a lower disc 8 and an upper frustoconical cap 9. The frustoconical cap 9 is secured to a shaft 10 carrying at its opposite end a pulley 11 adapted to be rotated by a drive belt 12 itself driven by a pulley 13 in turn driven by an electric motor B controlled by a cyclically operated device not shown.

The lower disc 8 is formed integrally with a downwardly extending sleeve 14 freely rotatably mounted by means of a ball bearing 16 on the shaft 10. A bushing 17 carries at its upper end the ball bearing 16 which in turn carries the sleeve 14 formed integrally with the disc 8 and receiving the shaft 10 mounted for free axial movement together with the sleeve 14.

The shaft 10, driven by means of the above-mentioned pulleys by the electric motor B, rotates the frustoconical cap 9 firmly secured thereto and also entrains the disc 8 firmly engaging the cap 9 under the action of a spring 18 inserted between these two parts and engaging with its lower end a setscrew 15 on the central shaft 10.

The recess 6, located in the central portion of the frustoconical cap 9 as seen in FIG. 6, forms part of the shaft 10 and the walls of the cap 9 radially surrounding the recess 6 are provided with slots 19 as seen in FIG. 4. The circumferential edge of the cap 9 is provided with a series of small radial incisions 20. The lower disc 8 is provided at its edge with two outwardly extending shoulders 21 and 21'. Under the action of the spring 18 the frustoconical cap 9 firmly adheres at its circumference to the lower disc 8, as seen in FIGS. 1 to 4, except in the small interval in which the coffee grounds are discharged, as shown in FIGS. 5, 7 and 8. The two contacting circumferential edges of the disc 8 and cap 9 are located just above an upper annnular chamber 22, as shown in FIG. 1. The upper annular chamber 22 is provided with a small outwardly directed discharge tube 23.

The bushing 17 is axially shiftably mounted in a cylinder 24 formed by the lower portion of the unit 1. A bifurcated lever 25 (FIGS. 1, 3, 7) is provided for shifting the bushing 17 and for this purpose has attached to each of its bifurcated ends a screw bolt 26, and 27, respectively, as shown in FIG. 7. The bolts 26 and 27 each has an extended end passing through slots 29 and 30 in the cylinder 24 (FIG. 7) and engaging in two holes 31 in the bushing 17, the holes 31 being relatively displaced at 180° and only one of them being shown in FIG. 8.

The fulcrum of the bifurcated lever 25 is located on a roller 32 arranged below the bottom surface of the unit 1 between this surface and a bracket secured to the unit 1, as shown in FIG. 1. The other end of the bifurcated lever 25 terminates in an extension 33 pivoted to a connecting rod 34 controlled by an eccentric 35 on a reduction gear 36 which moves the eccentric and is driven by an electric motor 37 receiving an electric pulse from a cyclically operating device not shown, so as to move the eccentric 35. Movement of the eccentric 35 by one turn is started by a microswitch 38 through a cam disk 39 rotating on the slowly moving shaft of the reduction gear carrying the eccentric.

After preparation of the coffee liquor the gear motor is automatically energized by an electric pulse received from the aforementioned cyclically operating device and moves through the bifurcated lever 25 and the bushing 17 the entire rotatable unit, still in rotation, to a lower annular chamber 40 where the frustoconical cap 9, still firmly adhering to the disc 8, stops, i.e. it does not move further down as the cross section of the shaft 10 is reduced at the portion 10' and an adjacent thicker portion 42 of the shaft 10 contacts a bushing 41' mounted in a ball bearing 41 at the lower end of the cylinder 24. During the axial movement of the shaft 10 its portion 10' is guided in the bushing 41'. After the cap 9 has stopped the lower disc 8 continues to move downwardly against the resistance of the spring 18, the cap 9 being pushed by the bushing 17 through the ball bearing 16. When the disc 8 has arrived at its lower dead center, it has moved downwardly away from the frustoconical cap 9 so as to form an annular circumferential opening between the cap 9 and the plate 8, which is sufficiently wide to permit the discharge of the exhausted coffee grounds under the action of centrifugal force. The exhausted coffee grounds are thrown into the lower chamber 40 and from there by the shoulders 21 and 21' on the disc 8 into a discharge channel 43 (FIG. 8) so that the chamber 40 will always remain clean.

The mode of operation of the coffee brewer is as follows:

In the position shown in FIG. 1 the exact dosis of ground coffee is poured into the brewer which is driven through the shaft 10 by the electric motor B controlled by the cyclically operating device. The ground coffee passes into the recess 6 in the cap 9 and from there through the slots 19 into a chamber 44 between the lower disc 8 and the frustoconical cap 9, wherein it accumulates under the action of the centrifugal force at the periphery of this chamber, i.e. in the region of the connection between the disc 8 and the cap 9 forming the rotatable unit, as indicated by C in FIG. 1. Immediately afterwards the hot water prepared in the boiler 2 is introduced under pressure through the associated pipes and the downwardly open annular tube 3 above the hopper 4 and escapes through the opening of the tube 3 under control of an electric valve 45 and thus under pressure and flows into the recess 6 in the cap 9 and then into the chamber 44 where it is thrown by centrifugal force onto the ground coffee at the periphery of this chamber, penetrates the ground coffee and escapes through the incisions 20 acting as a filter. The coffee liquor is then throw onto the periphery of the upper annular chamber 22 from where it is extracted, ready for consumption, through the short discharge tube 23.

After the brewing cycle is completed, the motor gear is automatically set into motion and actuates the eccentric 35 which through the connecting rod 34 acts upon the bifurcated lever 25 and the bushing 17 to move the entire rotatable unit downwardly.

When the thicker portion 42 of the shaft 10 encounters the upper end of the bushing 41' mounted in the ball bearing 41, vertical downward movement of the shaft 10 stops. In this position the region of connection between the disc 8 and the cap 9 is located adjacent the lower annular chamber 40. After downward movement of the shaft 10 has stopped, the bushing 17, however, continues to move downwardly and also moves the disc 8 downwardly against the resistance of the spring 18 (see FIGS. 7 and 8) so that a wide annular aperture is formed in the region of connection 46 (FIG. 4) between the disc 8 and the cap 9 and the coffee grounds can escape through this aperture under the action of the centrifugal force and is thrown into the chamber 40 from where it is conveyed into the discharge channel 43 by the shoulders 21 and 21' on the disc 8 so that the chamber 44 will remain always clean as described before.

The further rotation of the gear motor causes the entire rotatable unit to return to the upper dead center, the gear motor acting through the connecting rod 34 and the bifurcated lever 25. After that the gear motor will be stopped by the microswitch 38 which is de-energized by the cam disk 39 and the gear motor will come to a halt in the initial position shown in FIG. 1, in which it is ready to start a new working cycle. After completion of this working cycle also the electric motor B is deenergized by the cyclically working device.

It should particularly be noted that the boiler 2 is provided with a cover 47 which is in contact with the lower part of the unit 1, as shown in FIG. 7, and thus transmits the heat produced within the boiler 2 to the unit 1 to keep the latter warm.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

We claim:

1. A coffee brewer comprising
a fixed unit,
a rotatable unit insertable and vertically movable in the fixed unit,
a hopper on top of the fixed unit for introduction of ground coffee,
a downwardly open annular tube above the hopper for supply of hot water into and through said hopper,
a conventional electric valve arranged upstream of said hopper in a hot water supply conduit to control the supply of hot water,
a conventional boiler for preparing and supplying hot water to said hopper,
two radial annular chambers arranged one above the other in said fixed unit adjacent the upper portion of said rotatable unit, the upper radial chamber serving to receive the coffee liquor and the lower one to receive the exhausted coffee grounds,
a chamber in the upper portion of said rotatable unit, adapted to receive ground coffee and hot water for preparing the coffee liquor therein,
said rotatable unit being composed of two coaxial parts arranged one above the other and forced into engagement with each other by spring, the upper one of said coaxial parts being provided with means to permit the coffee liquor to escape into said upper annular chamber, and
conventional electric motor and reduction gear means for driving said rotatable unit,
the arrangement being such that said rotatable unit, after the coffee liquor has been extracted, will move downwardly while continuing to rotate at the same speed, with its two component parts firmly adhering to each other at their circumferential edges, until the circumferential edges are level with said lower annular chamber whereupon only the lower part of said rotatable unit will continue to move downwardly against the action of said spring so that an annular circumferential opening will be formed between the two parts of said rotatable unit to permit the exhausted coffee grounds to escape into said lower radial annular chamber.

2. A coffee brewer as claimed in claim 1, wherein the two parts forming the rotatable unit are a lower disc and an upper frustoconical cap adapted to be brought into engagement with each other at their circumferential edges to define a coffee brewing chamber.

3. A coffee brewer as claimed in claim 2, wherein the upper frustoconical cap is provided with a central recess having side walls provided with slots and the hopper extends with its lower end into this recess and the frustoconical cap has at its outer circumferential edge a series of radial incisions working as a filter for the coffee liquor passing therethrough.

4. A coffee brewer as claimed in claim 2, wherein the frustoconical cap is secured to a central shaft mounted in a first bushing on a first ball bearing and said first bushing is formed integrally with the lower disc.

5. A coffee brewer as claimed in claim 4, wherein the central shaft carries the spring forcing the two parts of the rotatable unit toward each other and the spring is inserted inside said first bushing between said lower disc and a setscrew secured to said central shaft near its lower end.

6. A coffee brewer as claimed in claim 4, wherein the lower portion of the central shaft is reduced in cross section and this reduced portion is shiftably guided in a second bushing mounted in a second ball bearing located in a cylindrical lower extension of the coffee brewer serving to slidably accommodate said first bushing carrying at its upper inner end said first ball bearing.

7. A coffee brewer as claimed in claim 4, wherein the central shaft carries at its lower end a pulley driven by means of a drive belt by said electric motor.

8. A coffee brewer as claimed in claim 4, wherein a bifurcated lever is provided for shifting said first bushing and thereby said rotatable unit in a cylindrical chamber formed by a cylindrical lower extension of the coffee brewer and a connecting rod is provided for moving the bifurcated lever and is itself arranged to be moved by an eccentric adapted to be moved by a motor with reduction gear in such a manner that it will perform one complete revolution for each brewing cycle to discharge the coffee grounds.

9. A coffee brewer as claimed in claim 8, wherein a cam disk is secured to the driven shaft of the reduction gear to cooperate with a conventional microswitch and actuate the latter when the rotatable unit has reached its upper dead center, said microswitch being arranged to act upon said connecting rod controlling said bifurcated lever to return said rotatable unit to its initial position.

10. A coffee brewer as claimed in claim 1, wherein the boiler is provided with a cover engaging the lower portion of the coffee brewer to transmit the heat produced in the boiler to the coffee brewer itself so that the entire unit serving to brew the coffee is kept at a constant temperature.

11. A coffee brewer as claimed in claim 1, wherein the rotatable unit is adapted to perform a reciprocating movement to discharge the coffee grounds, said reciprocating movement being controlled by a motor with reduction gear through a connecting rod system.

References Cited

UNITED STATES PATENTS

| | | | |
|---|---|---|---|
| 3,171,344 | 3/1965 | Mathieu | 99—287 |
| 3,266,410 | 8/1966 | Novi | 99—287 |
| 3,339,476 | 9/1967 | Troya | 99—287 |

ROBERT W. JENKINS, Primary Examiner